March 25, 1969

G. S. WING 3,434,379

INHERENTLY TORQUE-LIMITED FASTENER

Filed May 5, 1967

INVENTOR.
GEORGE S. WING
BY
*Angus & Mon*
ATTORNEYS.

United States Patent Office 3,434,379
Patented Mar. 25, 1969

3,434,379
INHERENTLY TORQUE-LIMITED FASTENER
George S. Wing, Torrance, Calif., assignor to Hi-Shear Corporation, Torrance, Calif., a corporation of California
Filed May 5, 1967, Ser. No. 636,434
Int. Cl. F16b *31/00, 33/04, 39/28*
U.S. Cl. 85—61          6 Claims

ABSTRACT OF THE DISCLOSURE

An inherently torque-limited fastener of the type which has a driving ring that separates from the threaded driven body upon the application of a predetermined torque to the driving ring, thereby leaving the driven body installed at said predeterminned torque level, and in particular to a fastener of this type which has a low profile.

---

Figure 1:
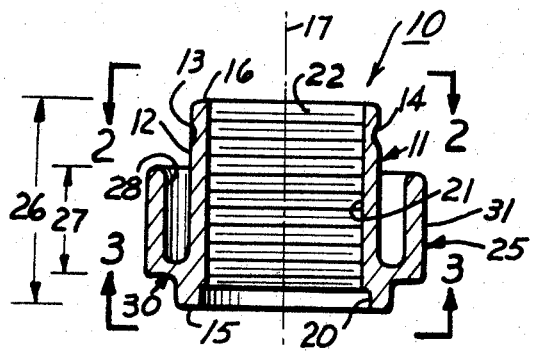

This invention relates to an inherently torque-limited fastener of the type which has a driving ring which separates from the threaded driven body upon the application of a predetermined torque. Fasteners of this class are known, see for example U.S. Patent No. 2,940,495, issued to George S. Wing on June 14, 1960. This type of fastener has enjoyed widespread acceptance because of its providing numerous advantages that are not attainable with conventional fasteners. These advantages relate to the application of a correct torque level in a threaded joint to create a predetermined axial preload in a shank member to which it is attached and thereby the desired tightness of a joint and then the removal of the means to drive the fastener in order that the fastener cannot be tampered with thereafter.

This tamper-proof feature is of considerable importance, especially in assembly operations where the torque level is the subject of later inspections. With convention fasteners, it is common for an inspector to use a torque wrench to check the already-applied torque. This often involves successive torque applications of increasingly higher magnitude, sometimes resulting in breakage of the shank, and always resulting in a different torque than that which was originally applied. By the separation of the driving ring from the driven body, a visual indication of the actual application of the correct torque, as well as physical certainty of the application of the correct torque, are assured, and the disadvantages of the prior art are overcome, because inspection is visual only.

One of the few disadvantages of the aforesaid Wing nut construction resides in the fact that it has a relatively high profile so that it is difficult to install it in regions of limited height clearance, for example between flanges. Ordinary nuts require only that a clearance between the shank and the nearest body equal to or slightly greater than the height of the nut itself be provided. In the aforesaid Wing nut construction, however, the height must be that of the driven portion which remains, plus that of the driving portion which breaks off and is discarded. It is an object of this invention to provide a construction wherein the height limitations are reduced to those of conventional nuts.

An inherently torque-limited fastener according to this invention includes a driven body having an axis and an internally axially threaded passage. It has a first and a second end, the first end being adapted to bear against an object from which a threaded body such as a shank or a bolt projects. The threads of this shank body are intended to be engaged by those of the driven body. A driving ring surrounds the driven body and is contained within the axial spacing between the first and second ends of the driven body. A shear web makes a full peripheral interconnection between the driving ring and the driven body, the shear web being dimensioned so as to shear and separate the driven body and the driving ring upon the application of a predetermined torque to the driving ring.

According to a preferred but optional feature of the invention, the driven body is substantially circular except in a region adjacent to its second end where it is out of round so as resiliently to grip the threaded body when threaded thereon.

Figure 2:
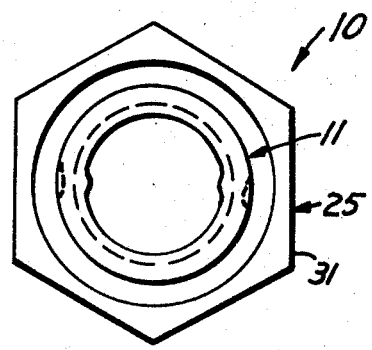
Figure 3:
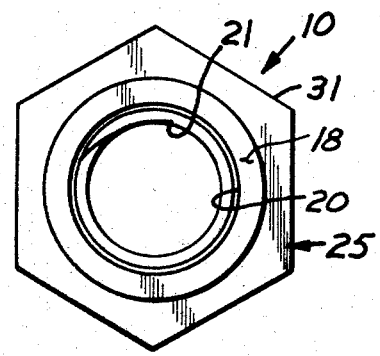
Figure 4:
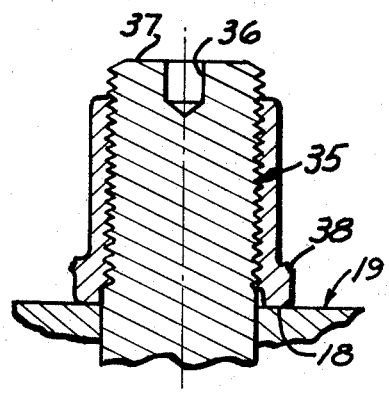

The above and other features of this invention will be fully understood from the following detailed description and the accompanying drawings in which:

FIG. 1 is an axial cross section of the presently preferred embodiment of the invention;

FIGS. 2 and 3 are top and bottom views, respectively, taken at lines 2—2 and 3—3 in FIG. 1; and FIG. 4 is an axial cross section showing the device of FIG. 1 installed upon a threaded shank body.

In FIG. 1, there is shown an inherently torque-limited fastener 10 according to this invention. It includes a driven body 11 which is generally circular, and preferably cylindrical. It includes a generally circular outer wall 12 except at a region near a pair of dimples 13, 14 which are formed when the wall is pressed out of round at this region. The slight out-of-round condition is best shown in FIG. 2, although it is exaggerated for purposes of illustration. The outer wall may be tapered or otherwise shaped, if preferred.

The driven body has a first and second end 15, 16, respectively, and extends along a central axis 17. The dimples are disposed adjacent to the second end. At the first end, there is a disc-shaped bearing surface 18 adapted to bear against an object 19 (see FIG. 4) forming part of a joint which the fastener is intended to complete.

A counterbore 20 is formed adjacent to the first end and an axial passage 21 extends the rest of the way through the driven body. The counterbore will pass an unthreaded portion of a shank, if necessary. An internal thread 22 is formed in the wall of the axial passage.

A driving ring 25 is contained entirely within the axial spacing 26 between the first and the second ends. Its axial extent is indicated by numeral 27, which is no greater than spacing 26 and which does not project beyond the limits of spacing 26. Preferably, an annular groove 28 is formed between the inner wall of the driving ring and the outer wall of the driven body. The driving ring and the driven body are joined by a shear web 30 whose dimensions, thickness, and inherent strength of material determine the torque required to separate the driving ring from the driven body. The shear web makes a full and uninterrupted interconnection between the driving ring and the driven body. The driving ring has an external periphery 31 which preferably is noncircular and is adapted to be engaged by a driver. As shown, the external periphery is hexagonal so that it can be engaged by a conventional hexagonal socket. As best shown in FIGS. 1 and 4, all parts of the driving ring and shear web may be axially spaced from first end 15 toward second end 16 in order that these portions will clear object 19. When such clearance is provided, there will be no diversion of torque to binding or frictional forces, which diversion would make unpredictable the actual torque delivered to the fastener system.

Fastener 10 is intended to be attached to a threaded shank body 35 which projects beyond an object 19. Preferably, shank body 35 includes a driver-engaging recess 36 in its first end 37. This may conveniently be a hexagonally shaped recess for engagement by one part of a driver system, the other part of which engages the driving ring. Drivers of this general class are illustrated in U.S. Patents Nos. 2,887,773 and 3,041,902, issued to George S. Wing on Apr. 21, 1959, and July 3, 1962, respectively.

The use of this fastener should be evident from the drawings. The fastener is first loosely threaded on to shank body 35 and then is engaged by the tool which turns the driving ring until surface 18 of the fastener engages object 19. At this time torque builds up and the fastener proceeds to apply axial preload to the joint through the shank body. When the predetermined torque is reached, the shear web shears as shown approximately at surface 38 in FIG. 4, and the driving ring falls loose and is no longer effective to drive the fastener. This serves as an indication that adequate torque has been applied, and also serves as means to prevent the further application of torque.

It will be seen that this configuration has the advantage of requiring no more profile height than that which is required for the driven body itself, and that the strength of the shear web is easily controlled because it can readily be made by a form tool when it forms the annular groove 28 from a single piece of material, as it will preferably be made.

The design considerations for making this device are evident and depend upon the size of the fastener and upon the inherent strength of materials of which it is made. these are readily calculable and establish the thickness of the shear web in the region where it will fracture upon the application of the predetermined inherently determined torque.

This invention is not to be limited by the embodiment shown in the drawings and described in the description which is given by way of example, and not of limitation.

I claim:

1. An inherently torque-limited fastener comprising: a driven body having an axis, an axial threaded passage, a first and a second end, the first end being adapted to bear against an object from which a threaded body projects, the threads of which are to be engaged to the threads in the passage, a driving ring surrounding, contained within the axial spacing between said first and second ends, and radially spaced from said driven body, and a shear web making a full peripheral interconnection between the driving ring and the driven body, said shear web being so dimensioned as to constitute the minimum cross sectional area between the driven body and the driving ring, whereby to shear and separate the driven body and the ring upon application of a pre-determined torque to the driving ring, all portions of the driving ring and the shear web being axially spaced from the first end toward the second end, thereby to provide clearance between the same and the object at all times.

2. A fastener according to claim 1 in which the driven body is substantially circular and tubular except in a region adjacent to its second end, where it is out of round so as resiliently to grip the threaded body when threaded thereon.

3. A fastener according to claim 2 in which an annular groove spaces apart the driving ring and the driven body.

4. A fastener according to claim 3 in which the shear web is adjacent to the first end.

5. A fastener according to claim 1 in which a counterbore opens from the threaded passage at said first end with a diameter sufficient to clear a shank adjacent to threads on the threaded body designed to engage the threads in the driven body.

6. A fastener according to claim 1 in which the outside periphery of the driving ring includes a noncircular section adapted to be engaged by a driving tool.

References Cited
UNITED STATES PATENTS

| 2,723,584 | 11/1955 | Parker | 85—32 |
| 2,816,591 | 12/1957 | Reiner | 151—21 |
| 2,940,495 | 6/1960 | Wing | 85—61 |
| 2,985,291 | 5/1961 | Schoepe | 285—3 |
| 3,034,611 | 5/1962 | Zenzic. | |
| 3,041,912 | 7/1962 | Kreider et al. | 85—1 |
| 3,174,385 | 3/1965 | Hallowell | 85—61 |
| 3,191,486 | 6/1965 | Gibbens | 85—61 |
| 3,267,792 | 8/1966 | Yackle | 85—61 |

CARL W. TOMLIN, *Primary Examiner.*

RAMON S. BRITTS, *Assistant Examiner.*

U.S. Cl. X.R.

151—21